(No Model.)

J. M. HOLT.
FILTER.

No. 471,385. Patented Mar. 22, 1892.

Witnesses:
J. B. McGirr.
N. ?. Bernhard

Inventor.
John M. Holt
By his Attorneys,
Edson Bro's

UNITED STATES PATENT OFFICE.

JOHN M. HOLT, OF MANCHESTER, VIRGINIA, ASSIGNOR OF ONE-HALF TO ALGERNON L. WILKINSON, SR.

FILTER.

SPECIFICATION forming part of Letters Patent No. 471,385, dated March 22, 1892.

Application filed November 19, 1890. Serial No. 371,929. (No model.)

*To all whom it may concern:*

Be it known that I, JOHN M. HOLT, a citizen of the United States, residing at Manchester, in the county of Chesterfield and State of Virginia, have invented certain new and useful Improvements in Filters; and I do hereby declare the following to be a full, clear, and exact description of the invention, such as will enable others skilled in the art to which it appertains to make and use the same.

This invention is an improved filter for the purification of contaminated and unwholesome water for all purposes where it is desirable and necessary to have pure clean water; and it relates particularly to that class of machines in which a series of stone or other porous cups are used, which, as ordinarily constructed, have not been accessible individually for the purpose of inspecting and cleansing each cup of the series of cups.

In filters of the class to which this invention belongs it frequently happens that contaminated and unfiltered water is allowed to pass through imperfect porous cups or joints into the discharge-pipe, and thus the whole cistern of purified water becomes contaminated and unfit for use before the defect is ascertained.

It is the object of my invention to overcome these defects, and I have provided an improved water-tight joint between the porous cups and the delivery-pipe and arranged each cup so that it can be tested separately from either of the cups of the series before the same is united to the discharge-pipe. The cups can be separately cleansed of sediment and accumulated matter and without disconnecting them from the tank-cap by closing the supply and discharge valves attached to each end of the cup-tank, and in this manner each cup can be disconnected and removed without detriment to the other operating-cups, or all the cups connected with the machine can be fed or shut off by opening or closing a single valve.

My invention consists in the novel combination of devices and peculiar construction and arrangement of parts, as will be hereinafter fully described and claimed.

To enable others to understand my invention, I will now proceed to a detailed description thereof in connection with the accompanying drawings, in which—

Figure 1:
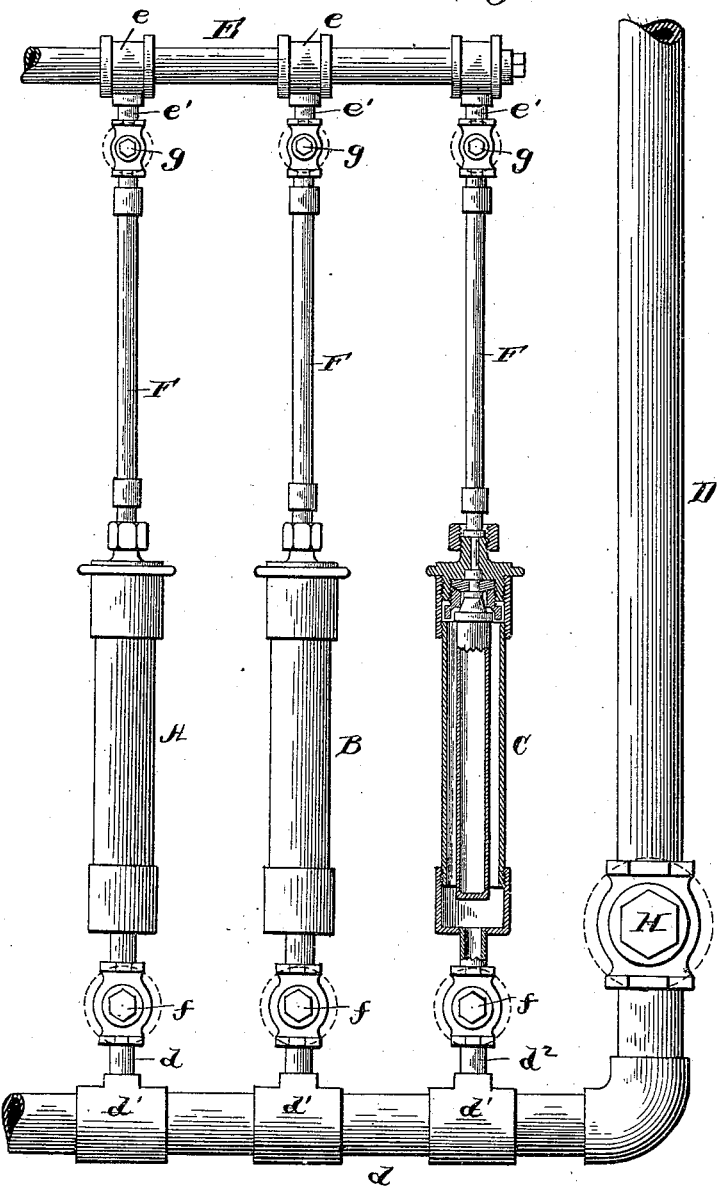
Figure 2:
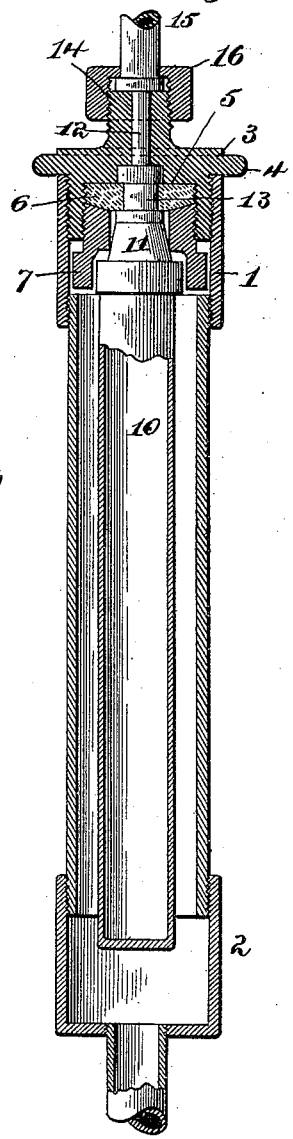

Figure 1 is an elevation, partly in section, of a filter constructed in accordance with my invention. Fig. 2 is a detail sectional view, on an enlarged scale, of one of the filter-tanks, cups, and parts associated therewith.

Like letters and numerals of reference denote corresponding parts in both figures of the drawings, referring to which—

A B C designate the series of vertical tanks or vessels.

D is the supply-pipe common to all the tanks of the series, and E is the discharge-pipe, into which water from all the tanks of the series is delivered.

As shown in the drawings, the supply-pipe D is arranged in a vertical position with a horizontal branch $d$ below the tanks and having a series of T-couplings $d'$, and between each T-coupling and the bottom of each tank is a pipe connection $d^2$ for conveying water from the branch $d$ to the tank. The discharge-pipe E is arranged in a horizontal position above the tanks and provided with a series of T-couplings $e$, each of which has a depending nozzle $e'$, and to the nozzles of the discharge-pipes are detachably connected a series of flexible pipes or tubes F, which are arranged between the series of tanks and the discharge-pipe. It is evident, however, that the pipes and tanks may be differently arranged and that the number of tanks may be increased or reduced to two or even one without departing from the spirit of my invention.

In the pipe connection $d^2$ between each tank and the supply-pipe is a stop-cock $f$, and in the nozzle $e'$ between the tank and the discharge-pipe is another stop-cock $g$, by closing which cocks each tank can be separately cut off from communication with the supply and discharge pipes to permit access to each tank and cup for the purpose of inspecting and cleaning the tanks and cups separately.

In the supply-pipe D, I provide a single valve H, which is located between the supply or entrance of the water and the series of cocks $f$, so that the supply to all the tanks can be cut off, as is obvious.

I will now describe my improved tank, porous cup, and the means for securing a separable water-tight joint between the suspended cup, the tank, and the flexible delivery pipe or tube F between the tank or cup and the discharge-pipe E. The tank, as indicated more clearly in Fig. 2, is provided at top and bottom with removable end pieces 1 2, which are screwed to the tank, and within the top piece 1 is screwed a cap 3, which is screw-threaded both externally and internally and provided with an annular flange 4, that rests on the upper edge of the top piece 1. This cap 4 is hollowed or chambered internally at 5, and it receives the gasket 6 and the gland 7, which gland is screwed into the lower end of the cap and clamps the gasket tightly between itself and the cap and forces the same close around the neck of the porous cup 10, which is suspended from the cap and extends therefrom into the tank. This porous cup is made of stone or other suitable material adapted for the passage and filtration of water, and said cup extends longitudinally within the tank and is arranged out of contact therewith to provide a surrounding space or chamber in which the water is free to pass and to percolate through the cup along the length of the same. The cup is made hollow to receive the filtered water and discharge the same into the pipe or tube F without commingling with the contaminated water which surrounds the cup. The neck 11 at the upper end of the cup is made slightly conical, and it is fitted snugly into a chamber in the gland, and this neck terminates in a tubular stem 12, which passes through the gasket 6, and is provided above the gasket with a collar 13, which collar rests on the gasket, whereby the stem is made to rest on the gasket, and the latter is supported and clamped tightly in place by the gland attached to the cap, thus suspending the porous cup in the tank, affording a water-tight joint and permitting the parts to be readily separated to have access to the tank and to the cup to cleanse the same of sediment. The upper part of the cap 3 is extended to form a nozzle 14, having an external screw-thread and an internal axial passage or water-way 15, into which passage the hollow stem of the suspended porous cup discharges the purified water, and to this hollow nozzle is detachably connected the lower end of the flexible pipe or tube F by means of a sleeve or union 16, which closely embraces the nipple 17 on said tube and is screwed upon the nozzle of the cap.

The operation and advantages of my invention will be readily understood and appreciated by those skilled in the art from the foregoing description taken in connection with the drawings.

In my machine any form of stone or porous cup may be used by a simple change in the form of the tank to accommodate the cup, and the piping may be of any form or material that may be found best adapted for transmission of various matter or materials contained in the liquid. I would therefore have it understood that I do not strictly confine myself to the form and proportion of parts or the details of construction or the materials herein specified, but hold myself at liberty to make such modifications as fairly fall within the scope of my invention.

Having thus described my invention, what I claim as new, and desire to secure by Letters Patent, is—

In a filter, a vertical imperforate tank, and a removable porous cup arranged concentric within the tank to provide an intermediate water-space, and the hollow discharge-stem at the upper end of said cup and provided with shoulders, in combination with the cap connected to the tank and having the chamber in its under side, the gasket fitted around the stem between the shoulders thereon and arranged in the chamber of the cap, and the gland connected to the cap and impinging against the gasket, for the purpose described.

In testimony whereof I affix my signature in presence of two witnesses.

JOHN M. HOLT.

Witnesses:
AUGUSTINE ROYALL,
JAMES L. CAPSTON.